United States Patent
Sun et al.

(10) Patent No.: US 10,317,204 B2
(45) Date of Patent: Jun. 11, 2019

(54) NEAR-BIT DYNAMIC WELL DEVIATION ANGLE MEASUREMENT METHOD AND APPARATUS

(71) Applicant: Institute of Geology and Geophysics, Chinese Academy of Sciences, Beijing (CN)

(72) Inventors: Yuntao Sun, Beijing (CN); Wenxuan Chen, Beijing (CN); Wenxiu Zhang, Beijing (CN); Yongyou Yang, Beijing (CN); Jian Zheng, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 15/692,703

(22) Filed: Aug. 31, 2017

(65) Prior Publication Data

US 2018/0058849 A1    Mar. 1, 2018

(30) Foreign Application Priority Data

Aug. 31, 2016 (CN) .......................... 2016 1 0799388

(51) Int. Cl.
*G01B 21/22* (2006.01)
*G01P 15/18* (2013.01)
(Continued)

(52) U.S. Cl.
CPC ............ *G01B 21/22* (2013.01); *E21B 47/022* (2013.01); *E21B 7/04* (2013.01); *G01P 15/18* (2013.01)

(58) Field of Classification Search
CPC ....................................................... G01B 21/22
See application file for complete search history.

(56) References Cited

U.S. PATENT DOCUMENTS 7,096,313 B1    8/2006  Chang et al.
7,762,854 B1    7/2010  Peng
(Continued)

FOREIGN PATENT DOCUMENTS

CN          1740746 A     3/2006
CN          2849164 Y    12/2006
(Continued)

*Primary Examiner* — Manuel A Rivera Vargas
(74) *Attorney, Agent, or Firm* — Novick, Kim & Lee, PLLC; Allen Xue

(57) ABSTRACT

A near-bit dynamic well deviation angle measurement apparatus includes a circuit board and 2n+1 accelerometers. One accelerometer is installed in an axial direction of a drilling tool and forms n sets of three-axis orthogonal installation together with other 2n accelerometers. The accelerometer installed in the axial direction measures Az', and the remaining accelerometers respectively measure n X-axis radial components and n Y-axis radial components corresponding to the n X-axis radial components. A filter and a data processing unit are integrated on the circuit board. The circuit board acquires signals in which the components are eliminated by the accelerators in real time, and further high-frequency vibration and impact interference in the signals are filtered out by using the filter to obtain non-interference gravitational acceleration components Ax, Ay and Az, and further a well deviation angle is calculated.

9 Claims, 4 Drawing Sheets

(51) Int. Cl.
*E21B 7/04* (2006.01)
*E21B 47/022* (2012.01)

(56) References Cited

U.S. PATENT DOCUMENTS

| | | | |
|---|---|---|---|
| 2001/0012703 A1 | 8/2001 | Wurm et al. | |
| 2002/0075114 A1 | 6/2002 | Hall et al. | |
| 2005/0267686 A1* | 12/2005 | Ward | E21B 43/127 702/6 |
| 2007/0247329 A1 | 10/2007 | Petrovic et al. | |
| 2008/0105423 A1* | 5/2008 | Estes | E21B 47/04 166/250.01 |
| 2009/0023502 A1 | 1/2009 | Koger | |
| 2009/0153355 A1 | 6/2009 | Price et al. | |
| 2011/0042073 A1* | 2/2011 | Legendre | E21B 49/00 166/250.01 |
| 2011/0196612 A1* | 8/2011 | Bonavides | G01V 11/005 702/6 |
| 2012/0249338 A1 | 10/2012 | Merino | |
| 2012/0299743 A1 | 11/2012 | Price et al. | |
| 2014/0332235 A1 | 11/2014 | Mueller et al. | |
| 2015/0331138 A1* | 11/2015 | Estes | G01V 3/26 324/346 |

FOREIGN PATENT DOCUMENTS

| | | |
|---|---|---|
| CN | 101289935 A | 10/2008 |
| CN | 201221354 Y | 4/2009 |
| CN | 101493008 A | 7/2009 |
| CN | 102418516 A | 4/2012 |
| CN | 202187758 U | 4/2012 |
| CN | 103061755 A | 4/2013 |
| CN | 103577121 A | 2/2014 |
| CN | 204283400 U | 4/2015 |
| CN | 204283413 U | 4/2015 |
| CN | 105353357 A | 2/2016 |
| CN | 105760113 A | 7/2016 |
| CN | 105804722 A | 7/2016 |
| CN | 206299372 U | 7/2017 |
| CN | 206299375 U | 7/2017 |

* cited by examiner

NEAR-BIT DYNAMIC WELL DEVIATION ANGLE MEASUREMENT METHOD AND APPARATUS

TECHNICAL FIELD

The present invention mainly belongs to the field of oil and gas exploration, and particularly relates to a near-bit dynamic well deviation angle measurement method and apparatus.

BACKGROUND

In logging while drilling and drilling operations, it is necessary to measure information of a drilling trajectory in real time, so that a ground operation engineer can adjust a drilling speed and a drilling direction in real time and complete the drilling operation according to the set well trajectory. In directional drilling in highly-deviated wells, horizontal wells and multilateral wells, it is especially important to measure a well deviation angle, a tool face angle, and an azimuth angle.

The average length of a measuring point of a conventional well deviation angle measurement system is more than 20 meters, which is far away from the bit. Measured information of a stratum is delayed, which is particularly unfavorable to the development of a thin oil reservoir and cannot determine the change of the drilling tool in the oil reservoir. At present, the trend is to install more sensors near the bit, the smaller a distance from the bit is, the more accurate and timely the obtained information of the stratum is.

A well deviation angle measurement principle is obtained according to changes in gravitational components along a well axis and its vertical direction due to different well deviation angles. By installing three orthogonal acceleration sensors along three axial directions X, Y and Z of the drilling tool, the well deviation angle θ can be calculated according to components Ax, Ay and Az of a gravitational acceleration in the axial directions X, Y and Z:

$$\theta = \arctan\left(\frac{\sqrt{Ax^2 + Ay^2}}{Az}\right) \quad (1)$$

A conventional measure while drilling (MWD) technology adopts a static measurement manner, which stops drilling during measurement so as to reduce effects of vibration and impact and the like on the measurement accuracy. Outputs of the acceleration sensors are merely gravitational acceleration signals of the measuring point.

$$S_{state} = S_g \quad (2)$$

During near-bit dynamic measurement, the outputs of the acceleration sensors not only include a gravitational acceleration, but also include a centrifugal acceleration generated by the rotating of an instrument, and the vibration acceleration and the impact acceleration generated in a drilling process. The outputs of the acceleration sensors during dynamic measurement can be expressed as:

$$S_{dynamic} = S_g + S_v + S_e + S_s \quad (3)$$

wherein $S_g$ represents the gravitational acceleration, $S_v$ represents the vibration acceleration, $S_e$ represents the centrifugal acceleration, and $S_s$ represents the impact acceleration.

In order to improve the dynamic measurement accuracy of the well deviation angle, it is necessary to remove superimposed components of the vibration acceleration, the impact acceleration and the centrifugal acceleration, and extract components so that the result actually reflects the well deviation angle based on the gravitational acceleration.

There are problems as follows: the conventional measure while drilling (MWD) technology adopts the static measurement manner, which stops drilling during measurement, cannot measure information of the well deviation angle during drilling in real time, is lower in well site operation efficiency since a well trajectory may be obtained by only adopting a manner of fitting measurements of multiple points, and has a difference between the fit well trajectory and an actual drilling trajectory. Meanwhile, MWD is installed within a non-magnetic drill collar on a screw motor, which is away from the bit for about 20 meters, such that the information of the drilling trajectory may not be obtained in real time. During the near-bit dynamic measurement, the effects of the vibration acceleration, the impact acceleration and the centrifugal acceleration on the gravitational acceleration cannot be effectively eliminated.

SUMMARY

In view of the above-mentioned problems, an objective of the present invention is to provide a near-bit dynamic well deviation angle measurement method and apparatus, which realize dynamic well deviation angle measurement in a while drilling process, filter out effects of a centrifugal acceleration, a vibration acceleration and an impact acceleration on measurements, and meet requirements for high-accuracy geological orientation in the while drilling process.

In one embodiment of the current disclosure, a near-bit dynamic well deviation angle measurement apparatus includes a circuit board and 2n+1 accelerometers, wherein one accelerometer is installed in an axial direction of a drilling tool and forms n sets of three-axis orthogonal installation together with other 2n accelerometers. The accelerometer installed in the axial direction measures Az', and the remaining accelerometers respectively measure Ax1, Ax2, . . . , Axn and Ay1, Ay2, . . . , Ayn. X-axis radial components are eliminated by superimposing data of the Ax1, Ax2, . . . , Axn to obtain Ax', and Y-axis radial components are eliminated by superimposing data of the Ay1, Ay2, . . . , Ayn to obtain Ay'. A filter and a data processing unit are integrated on the circuit board, and the circuit board acquires signals in which the components are eliminated by the accelerators in real time, and further high-frequency vibration and impact interference in the signals are filtered out by using the filter to obtain components Ax, Ay and Az of a non-interference gravitational acceleration, and the data processing unit calculates a well deviation angle according to an algorithm.

n is a positive integer greater than 1.

Ax', the Ay' and the Az' represent components of the gravitational acceleration with high-frequency vibration and impact interference in axial directions X, Y and Z, respectively. Ax, the Ay and the Az represent the components of the non-interference gravitational acceleration in the axial directions X, Y and Z, respectively.

x1, x2, . . . , xn represent X axes in different directions and y1, y2, . . . , yn represent Y axes corresponding to x1, x2, . . . , xn.

Further, the data processing unit includes an analog-to-digital (ADC) converter, a field-programmable gate array, a processor and a memory. The analog-to-digital (ADC) converter is connected to the filter and the field-programmable gate array. The field-programmable gate array is connected to the processor. The processor is connected to the memory. The analog-to-digital (ADC) converter is used to convert the Ax, the Ay and the Az; and then the converted data is transmitted to the field-programmable gate array for data acquisition. The field-programmable gate array controls a data acquisition timing sequence, while the acquired data is digitally filtered and then transmitted to the processor. The processor stores the received data in the memory and calculates a well deviation angle parameter according to an algorithm.

Further, the 2n+1 accelerometers are integrated on a single independent sub, with a compact four-compartment design in which batteries are installed in the two compartments and the 2n+1 accelerometer and the circuit board are installed in the remaining two compartments.

Further, the filter has a low-stop-band 1 Hz filter, and the filter is selected according to a revolving speed. When the number of revolutions exceeds 10 revolutions per minute, the low-stop-band filter is activated to effectively eliminate the remaining centrifugal acceleration.

In other embodiments, n=2.

Further, an installation distance between the 2n+1 accelerometers in the apparatus and the bit is less than 1 m when the apparatus is used.

A near-bit dynamic well deviation angle measurement method adopts the above apparatus and includes the following steps:

(1) installing accelerometers, wherein one accelerometer is installed in an axial direction of a drilling tool and forms n sets of three-axis orthogonal installation together with other 2n accelerometers; the accelerometer installed in the axial direction measures Az', and the remaining accelerometers respectively measure Ax1, Ax2, . . . , Axn and Ay1, Ay2, . . . , Ayn;

(2) eliminating radial components, wherein X-axis radial components are eliminated by superimposing data of the Ax1, Ax2, . . . , Axn to obtain Ax', and Y-axis radial components are eliminated by superimposing data of the Ay1, Ay2, . . . , Ayn to obtain Ay';

(3) filtering out high-frequency vibration and impact interference, wherein a filter and a data processing unit are integrated on the circuit board, and the circuit board acquires signals in which the components are eliminated by the accelerators in real time, and further high-frequency vibration and impact interference in the signals are filtered out by using the filter to obtain components Ax, Ay and Az of a non-interference gravitational acceleration; and (4) calculating a well deviation angle, wherein the data processing unit calculates the well deviation angle by using the components Ax, Ay and Az of the non-interference gravitational acceleration according to an algorithm;

the n is a positive integer greater than 1;

the Ax', the Ay' and the Az' represent components of the gravitational acceleration with high-frequency vibration and impact interference in axial directions X, Y and Z, respectively;

the Ax, the Ay and the Az represent the components of the non-interference gravitational acceleration in the axial directions X, Y and Z, respectively;

x1, x2, . . . , xn represent X axes in different directions; and y1, y2, . . . , yn represent Y axes corresponding to x1, x2, . . . , xn.

Further, the data processing unit includes an analog-to-digital (ADC) converter, a field-programmable gate array, a processor and a memory; the Ax, Ay, Az are converted into data with a memory-receivable mode via the analog-to-digital (ADC) converter. The field-programmable gate array controls an acquisition timing sequence for data acquisition. The field-programmable gate array controls the data acquisition timing sequence, while the acquired data is digitally filtered and then transmitted to the processor. The processor stores the received data in the memory and calculates a well deviation angle parameter according to an algorithm.

Further, the algorithm is $$\theta = \arctan\left(\frac{\sqrt{Ax^2 + Ay^2}}{Az}\right);$$

and the $\theta$ is the well deviation angle.

Accordingly, using the apparatus and method disclosed herein, in a dynamic case, a mirror-image measurement and dynamic filtering method is adopted to eliminate effects of a centrifugal acceleration, a vibration acceleration and an impact acceleration on measurements, and meet requirements for while drilling geometrical orientation. In addition, the near-bit dynamic well deviation angle measurement apparatus of the present invention is installed close to the bit and can dynamically measure the well deviation angle in a drilling process. By taking interferences, including factors such as a centrifugal force, a vibration and an impact, in a measurement process into account, the mirror-image measurement and dynamic filtering method is creatively proposed to filter out the interferences and to obtain a measurement of the well deviation angle, which meets the accuracy requirement.

Further, the near-bit dynamic well deviation angle measurement apparatus of the present invention adopting a four-compartment structure design is reasonable in structure design, is installed at a position within 1 meter from the bit, is high in accuracy of measuring the well deviation angle, and is stable and reliable in operation.

DETAILED DESCRIPTION

Objectives, technical solutions and advantages of the present invention will become more apparent from the following detailed description of the present invention when taken in conjunction with accompanying drawings. It should be understood that specific embodiments described herein are merely illustrative of the present invention and are not intended to limit the present invention.

Rather, the present invention encompasses any alternatives, modifications, equivalents, and solutions made within the spirit and scope of the present invention as defined by the claims. Further, in order to give the public a better understanding of the present invention, some specific details are described below in detail in the following detailed description of the present invention. It will be appreciated by those skilled in the art that the present invention may be understood without reference to the details.

Example 1

Figure 1:
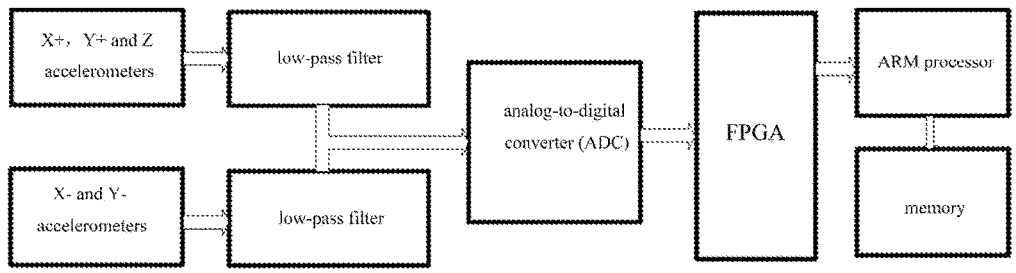
FIG. 1 is a structural diagram of a circuit of a well deviation angle measurement apparatus.
Figure 6:
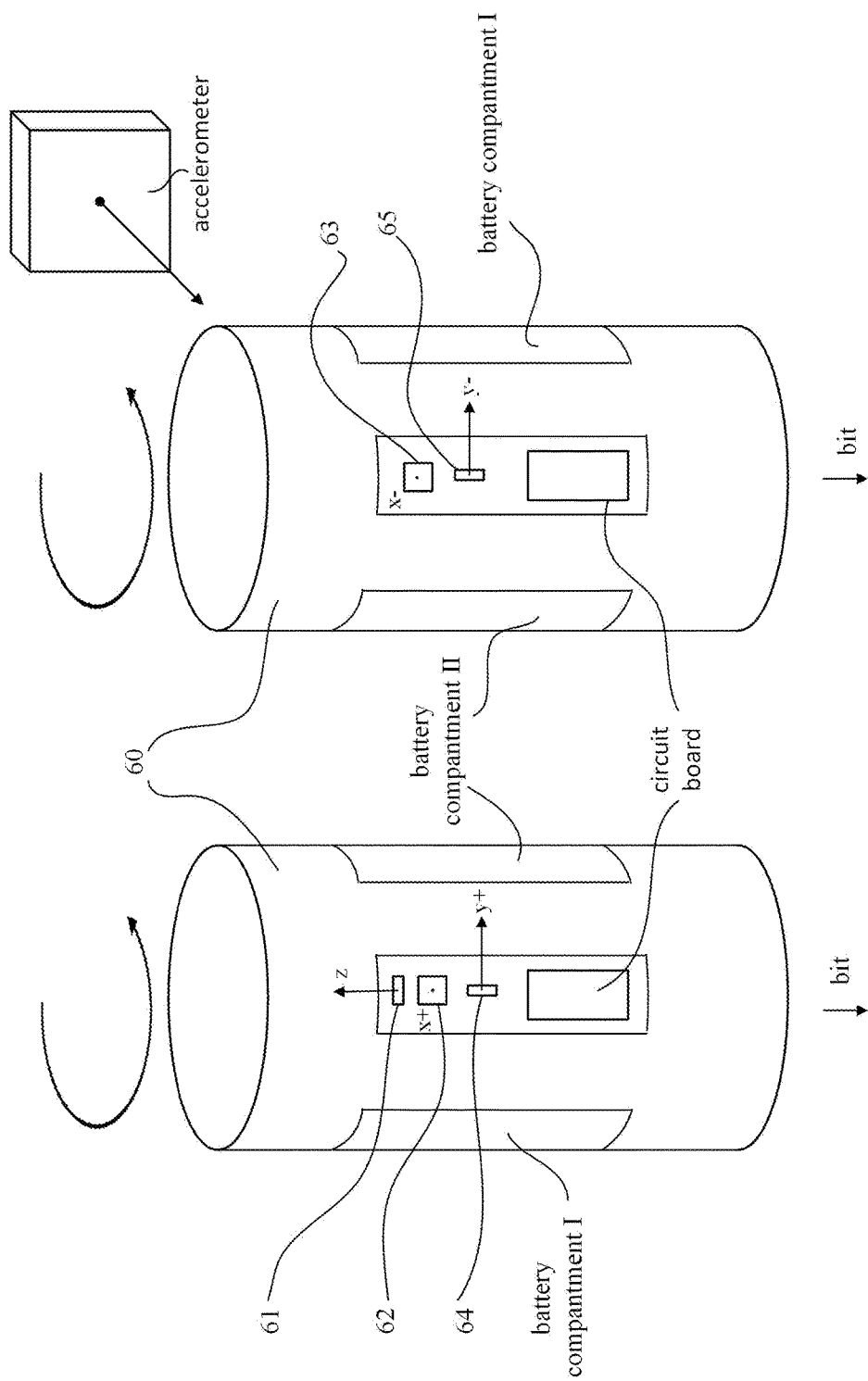
FIG. 6 is a schematic diagram showing an embodiment of the well deviation angle measurement apparatus of this disclosure.

FIG. 6 shows the front view and the back view of a near-bit dynamic well deviation angle measurement apparatus 60. The apparatus includes a circuit board and five accelerometers, wherein one accelerometer 61 is installed in an axial direction of a drilling tool and forms two sets of three-axis orthogonal installation together with the remaining four accelerometers, namely 62, 63, 64, 65. The accelerometers 61, 62, 63, 64, and 65 respectively measures data in five directions—Az, Ax+, Ay+, Ax− and Ay−. Ax+ and Ax− are in mirror-image placement and Ay+ and Ay− are in mirror-image placement. A filter and a data processing unit are integrated on the circuit board. The filter receives data measured by the five accelerometers, filters out high-frequency vibration and impact interference to obtain filtered data. The filtered data is transmitted to the data processing unit. The five accelerometers are integrated on a single independent sub, with a compact four-compartment design in which batteries are installed in the two compartments and the five accelerometers and the circuit board are installed in the remaining two compartments. The data processing unit includes an analog-to-digital (ADC) converter, a field-programmable gate array (FPGA), a processor and a memory. As shown in FIG. 1, the analog-to-digital (ADC) converter is connected to the filter and the field-programmable gate array. The field-programmable gate array is connected with to processor. The processor is connected to the memory. The analog-to-digital (ADC) converter is used to convert the filtered data. And then the converted data is transmitted to the field-programmable gate array for data acquisition. The field-programmable gate array controls a data acquisition timing sequence, while the acquired data is digitally filtered and then transmitted to the processor. And the processor stores the received data in the memory and calculates a well deviation angle parameter according to an algorithm. The filter has a low-stop-band filter, and the use of the filter is determined according to a revolving speed.

Figure 2:
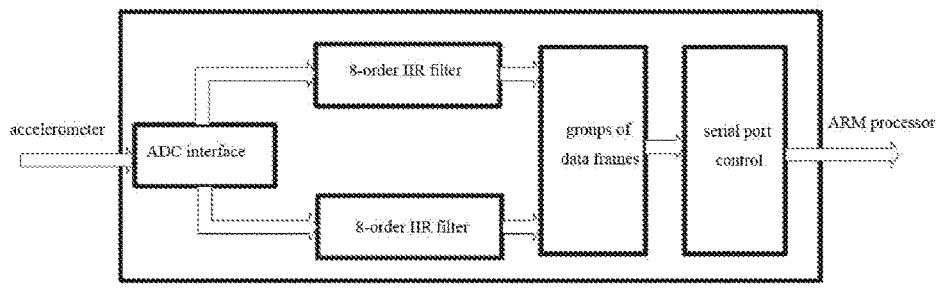
FIG. 2 is a structural diagram of FPGA firmware.
Figure 3:
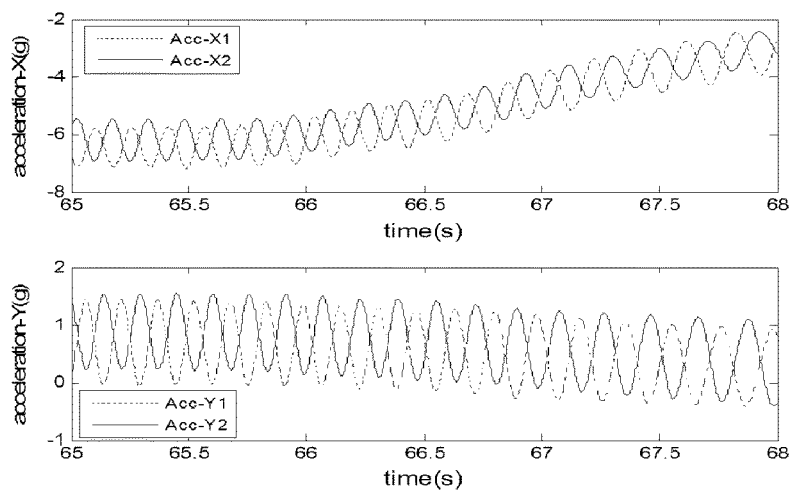
FIG. 3 is measured radial acceleration data.
Figure 4:
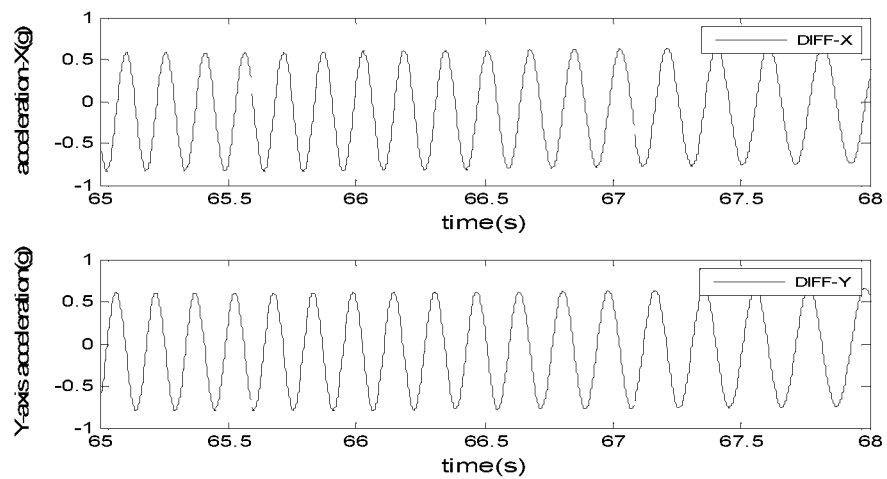
FIG. 4 is radial acceleration compensated data according to a first embodiment.
Figure 5:
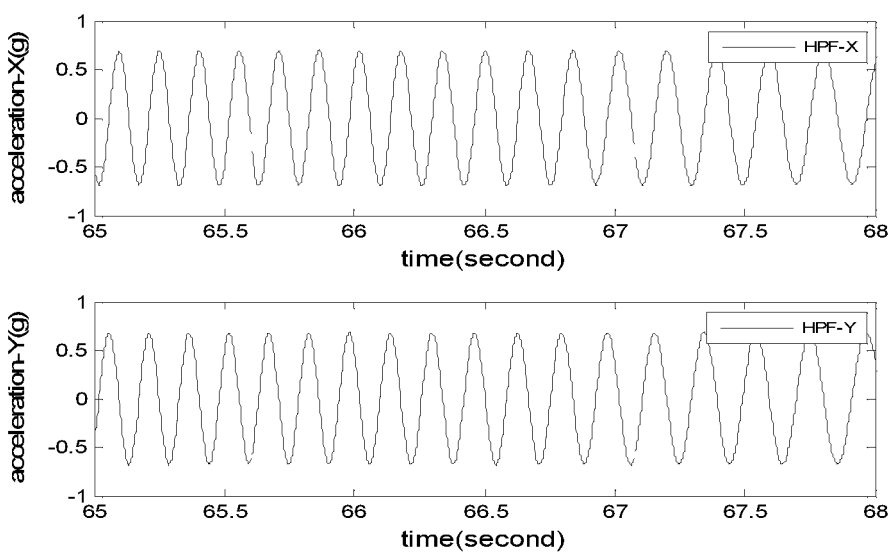
FIG. 5 is data filtered by a filter.

A near-bit dynamic well deviation angle measurement method adopts the above apparatus to perform measurement. Five accelerometers are installed at a position from a bit less than 1 m, and radial data obtained from the measurement deviates largely, as shown in FIG. 3. Before the data obtained from the measurement in the five directions are transmitted to the filter by the accelerometers. Data of Ax+ and Ax− are superimposed and data of Ay+ and Ay− are superimposed to obtain compensated data of a radial acceleration, as shown in FIG. 4. After the radial compensation, there are remaining components of a portion of a centrifugal force. The compensated data is filtered out by the filter to obtain components of a gravitational acceleration in two directions of X and Y, as shown in FIG. 5. The filtered-out data is transmitted to the processor and further a well deviation angle parameter is calculated. A timing sequence of acquiring the data by the processor is controlled by FGPH, and a structure of FPGA firmware is shown in FIG. 2.

Example 2

Figure 7:
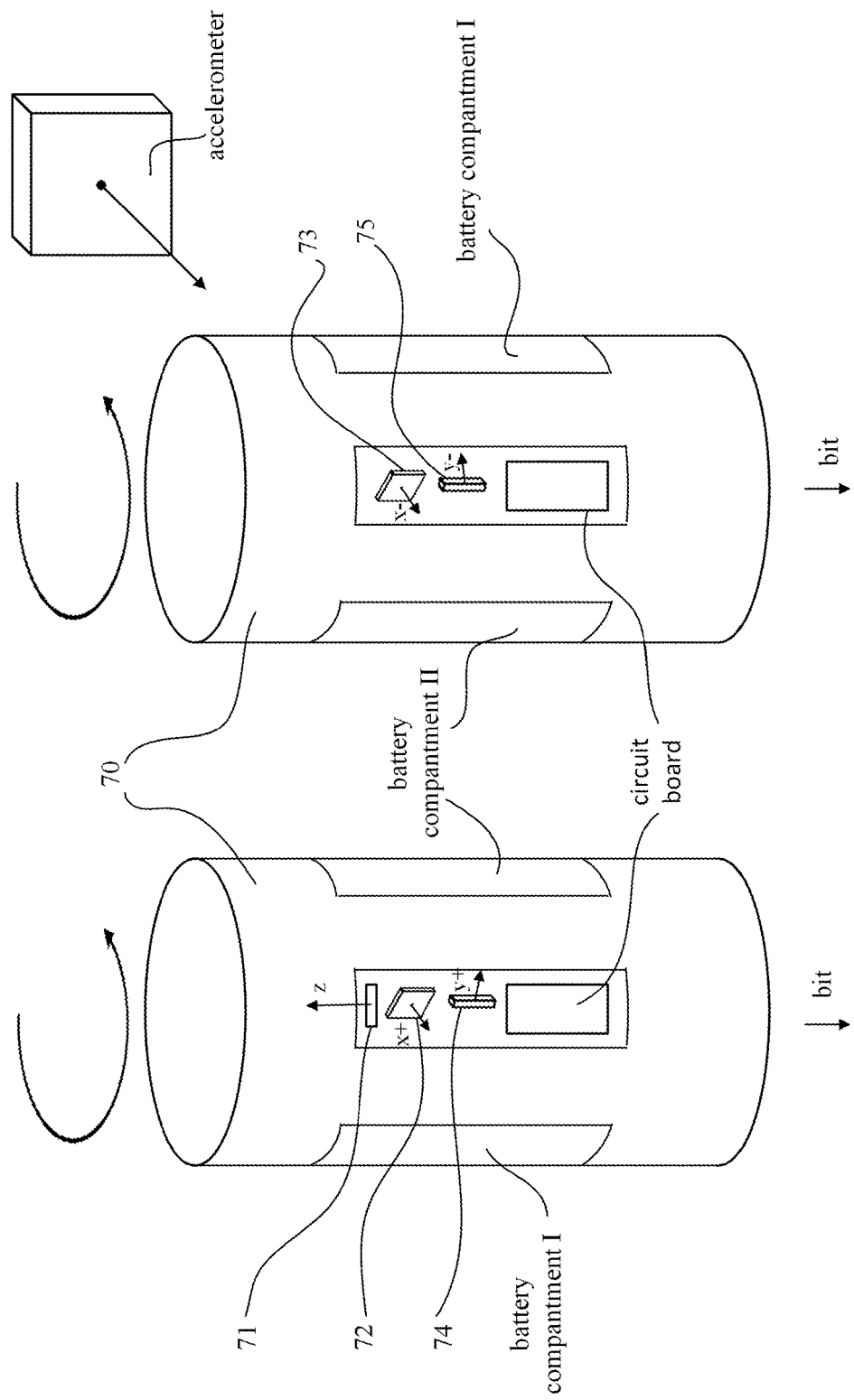
FIG. 7 is a schematic diagram showing another embodiment of the well deviation angel measurement apparatus of this disclosure.

FIG. 7 shows the front view and the back view of a near-bit dynamic well deviation angle measurement apparatus 71. The apparatus includes a circuit board and five accelerometers, wherein one accelerometer 71 is installed in an axial direction of a drilling tool and forms two sets of three-axis orthogonal installation together with the remaining four accelerometers—72, 73, 74, and 75; the accelerometers 71, 72, 73, 74, and 75 respectively measures data in five directions—Az, Ax+, Ay+, Ax− and Ay. Ax+ and Ax− are placed at a certain angle and Ay+ and Ay− are placed at a certain angle, and the angle is greater than 0 degree and less than 180 degrees. A filter and a data processing unit are integrated on the circuit board. The filter receives data measured by the five accelerometers, filters out high-frequency vibration and impact interference to obtain filtered data. And the filtered data is transmitted to the data processing unit. The five accelerometers are integrated on a single independent sub, with a compact four-compartment design in which batteries are installed in the two compartments and the five accelerometers and the circuit board are installed in the remaining two compartments. The data processing unit includes an analog-to-digital (ADC) converter, a field-programmable gate array, a processor and a memory; as shown in FIG. 1, the analog-to-digital (ADC) converter is connected with the filter and the field-programmable gate array, the field-programmable gate array is connected with the processor, the processor is connected with the memory. The analog-to-digital (ADC) converter is used to convert the filtered data; and then the converted data is transmitted to the field-programmable gate array for data acquisition; the field-programmable gate array controls a data acquisition timing sequence, while the acquired data is digitally filtered and then transmitted to the processor. The processor stores the received data in the memory and calculates a well deviation angle parameter according to an algorithm. The filter used adopts a low-stop-band filter, and the use of the filter is determined according to a revolving speed.

A near-bit dynamic well deviation angle measurement method may use the above apparatus to perform measurement. Five accelerometers are installed at a position from a bit less than 1 m, and radial data obtained from the measurement deviates largely, as shown in FIG. 3. Before the data obtained from the measurement in the five directions are transmitted to the filter by the accelerometers. Data of Ax+ and Ax− are superimposed after being subjected to known angle mapping and data of Ay+ and Ay− are superimposed after being subjected to known angle mapping. After the radial compensation, there are remaining components of a portion of a centrifugal force, and then the compensated data is filtered out by the filter to obtain components of a gravitational acceleration in two directions of X and Y, as shown in FIG. 5. The filtered-out data is transmitted to the processor, and further a well deviation angle parameter is calculated. A timing sequence of acquiring the data by the processor is controlled by FGPH, and a structure of FPGA firmware is shown in FIG. 2.

Example 3

A near-bit dynamic well deviation angle measurement apparatus includes a circuit board and seven accelerometers.

One accelerometer is installed in an axial direction of a drilling tool and forms three sets of three-axis orthogonal installation together with the remaining six accelerometers.

A filter and a data processing unit are integrated on the circuit board, the filter receives data measured by the seven accelerometers, filters out high-frequency vibration and impact interference to obtain filtered data. The filtered data is transmitted to the data processing unit. The seven accelerometers are integrated on a single independent sub, with a compact four-compartment design in which batteries are installed in the two compartments and the seven accelerometers and the circuit board are installed in the remaining two compartments. The data processing unit includes an analog-to-digital (ADC) converter, a field-programmable gate array, a processor and a memory; as shown in FIG. 1, the analog-to-digital (ADC) converter is connected to the filter and the field-programmable gate array. The field-programmable gate array is connected to the processor. The processor is connected to the memory. The analog-to-digital (ADC) converter is used to convert the filtered data. The converted data is transmitted to the field-programmable gate array for data acquisition. The field-programmable gate array controls a data acquisition timing sequence, while the acquired data is digitally filtered and then transmitted to the processor. The processor stores the received data in the memory and calculates a well deviation angle parameter according to an algorithm. The filter used adopts a low-stop-band filter, and the use of the filter is determined according to a revolving speed.

A near-bit dynamic well deviation angle measurement method adopts the above apparatus to perform measurement. Seven accelerometers are installed at a position from a bit less than 1 m, and radial data obtained from the measurement deviates largely, as shown in FIG. 3. Before the data obtained from the measurement in the seven directions are transmitted to the filter by the accelerometers, data of Ax1, Ax2 and Ax3 are superimposed after being subjected to known angle mapping, and data of Ay1, Ay2 and Ay3 are superimposed. After the radial compensation, there are remaining components of a portion of a centrifugal force, and then the compensated data is filtered out by the filter to obtain components of a gravitational acceleration in two directions of X and Y, as shown in FIG. 5. The filtered-out data is transmitted to the processor, and further a well deviation angle parameter is calculated. A timing sequence of acquiring the data by the processor is controlled by FGPH, and a structure of FPGA firmware is shown in FIG. 2.

The invention claimed is:

1. A near-bit dynamic well deviation angle measurement apparatus disposed above a drill bit in a drill string, comprises:
a circuit board having a data processing unit and a filter; and
2n+1 accelerometers, n being an integer greater than 1,
wherein the 2n+1 accelerometers includes a first accelerometer installed in a longitudinal direction Z of the measurement apparatus and measuring a value of Az', and n pairs of accelerometers disposed orthogonally to the first accelerometer,
wherein two accelerometers within each pair are orthogonal to each other, and measure a value of Axi and a value of Ayi, i=1 to n, respectively,
wherein the circuit board receives Axi, Ayi, and calculates Ax' and Ay' according to Ax'=$\Sigma_{i=1}^{n}$ Axi and Ay'=$\Sigma_{i=1}^{n}$ Ayi,
wherein the filter is configured to filter noises caused by high-frequency vibration and impact interference during drilling from Ax', Ay', and Az' to obtain Ax, Ay, and Az,
wherein Ax', Ay' and Az' represent components of a gravitational acceleration having noises from high-frequency vibrations and impact interferences in directions X, Y and Z, respectively, wherein Ax, Ay, and Az represent the filtered components of the gravitational acceleration in directions X, Y and Z, respectively, and
wherein xi represents the direction X in accelerometer pair number i, and yi represents direction Y in accelerometer pair number I.

2. The near-bit dynamic well deviation angle measurement apparatus according to claim 1, wherein the data processing unit comprises an analog-to-digital (ADC) converter, a field-programmable gate array, a processor, and a memory; the analog-to-digital (ADC) converter is connected with the filter and the field-programmable gate array, the field-programmable gate array is connected with the processor, the processor is connected with the memory,
wherein the analog-to-digital (ADC) converter converts Ax, Ay, and Az' into digital signals, the field-programmable gate array acquires Ax, Ay, and Az' from the analog-to-digital (ADC) converter according to a timing sequence, calculates Ax' and Ay', and filters Ax', Ay', and Az' to obtain Ax, Ay, and Az; and the processor receives and stores Ax, Ay, and Az in the memory and calculates a well deviation angle parameter using Ax, Ay, and Az.

3. The near-bit dynamic well deviation angle measurement apparatus according to claim 1, wherein the 2n+1 accelerometers are integrated on a single independent sub, wherein the sub comprises four compartments, two of the compartments house batteries and the other two compartments house the 2n+1 accelerometers.

4. The near-bit dynamic well deviation angle measurement apparatus according to claim 1, wherein the filter is a low-stop-band 1 Hz filter, and when a number of revolutions of the drill bit exceeds 10 revolutions per minute, the low-stop-band filter is activated to effectively eliminate a remaining centrifugal acceleration.

5. The near-bit dynamic well deviation angle measurement apparatus according to claim 1, wherein n=2.

6. The near-bit dynamic well deviation angle measurement apparatus according to claim 1, wherein a distance between the 2n+1 accelerometers and the drill bit is less than 1 m.

7. A near-bit dynamic well deviation angle measurement method, comprising the following steps:
(1) installing, on a measurement apparatus, a first accelerometer in a longitudinal direction Z thereof and n pairs of accelerometers orthogonally to the first accelerometer, n being an integer greater than one, wherein two accelerometers in each pair are orthogonal to each other;
(2) measuring Az', Axi, Ayi, wherein Az' is a component of a gravitational acceleration in direction Z, Axi is a component of the gravitational acceleration in the direction Xi, Ayi is a component of the gravitational acceleration in the direction yi, wherein i=1 to n;
(3) eliminating radial components in the gravitational acceleration to obtain Ax' and Ay', wherein Ax'=$\Sigma_{i=1}^{n}$ Axi and Ay'=$\Sigma_{i=1}^{n}$ Ayi;
(4) filtering noises from high-frequency vibration and impact interference during drilling from Ax', Ay', and Az' to obtain Ax, Ay, and Az; and (5) calculating a well deviation angle using Ax, Ay, and Az.

8. The near-bit dynamic well deviation angle measurement method according to claim 7, wherein step (5) is implemented in a data processing unit that comprises an analog-to-digital (ADC) converter, a field-programmable gate array, a processor, and a memory, wherein Ax, Ay, Az are converted into data with a memory-receivable mode via the analog-to-digital (ADC) converter, the field-programmable gate array acquires the converted data according to an acquisition timing sequence for data acquisition; while the acquired data is digitally filtered and then transmitted to the processor; and the processor stores the received data in the memory and calculates the well deviation angle parameter according to an algorithm.

9. The near-bit dynamic well deviation angle measurement method according to claim 8, wherein the algorithm is $$\theta = \arctan\left(\frac{\sqrt{Ax^2 + Ay^2}}{Az}\right)$$

and the θ is the well deviation angle.

* * * * *